(12) United States Patent
May

(10) Patent No.: US 7,340,937 B1
(45) Date of Patent: Mar. 11, 2008

(54) METHOD FOR DETERMINING HYDROGEN MOBILITY AS A FUNCTION OF TEMPERATURE IN SUPERCONDUCTING NIOBIUM CAVITIES

(75) Inventor: Robert May, Virginia Beach, VA (US)

(73) Assignee: Jefferson Science Associates LLC, Newport News, VA (US)

( * ) Notice: Subject to any disclaimer, the term of this patent is extended or adjusted under 35 U.S.C. 154(b) by 177 days.

(21) Appl. No.: 11/270,714

(22) Filed: Nov. 9, 2005

(51) Int. Cl.
    *G01N 33/00* (2006.01)
(52) U.S. Cl. ...................................... 73/23.2
(58) Field of Classification Search ................ 73/23.2
    See application file for complete search history.

(56) References Cited

U.S. PATENT DOCUMENTS

| | | |
|---|---|---|
| 4,476,100 A | 10/1984 | Knize et al. |
| 5,041,147 A | 8/1991 | Knize et al. |
| 5,961,362 A | 10/1999 | Chalamala et al. |
| 6,497,769 B1 | 12/2002 | Martin |

OTHER PUBLICATIONS

Knobloch, J. et al.,"Enhanced Susceptibility of Nb Cavity Equator Welds to the Hydrogen Related Q-Virus", Presented at the Workshop on RF Superconductivity, Padova, Italy, 1997, pp. 1-8.*
Enderlein, G. et al., "Investigations on Hydrogen Contamination of Superconducting Cavities", Particle Accelerator Conference, 1991. 'Accelerator Science and Technology'., Conference Record of the 1991 IEEE, May 6-9, 1991, pp. 2432-2434.*
Knobloch, J., "The "Q-Disease" in Superconducting Niobium RF Cavities", Hydrogen in Materials and Vacuum Systems, First International Workshop on Hydrogen in Materials and Vacuum Systems, AIP Conference Proceedings, vol. 671, 2003, pp. 133-150.*

* cited by examiner

Primary Examiner—Daniel S. Larkin

(57) ABSTRACT

A method for determining the mobility of hydrogen as a function of temperature in superconducting niobium cavities comprising: 1) heating a cavity under test to remove free hydrogen; 2) introducing hydrogen-3 gas into the cavity; 3) cooling the cavity to allow absorption of hydrogen-3; and 4) measuring the amount of hydrogen-3 by: a) cooling the cavity to about 4° K while flowing a known and regulated amount of inert carrier gas such as argon or helium into the cavity; b) allowing the cavity to warm at a stable rate from 4° K to room temperature as it leaves the chamber; and c) directing the exit gas to an ion chamber radiation detector.

3 Claims, 1 Drawing Sheet

METHOD FOR DETERMINING HYDROGEN MOBILITY AS A FUNCTION OF TEMPERATURE IN SUPERCONDUCTING NIOBIUM CAVITIES

The United States of America may have certain rights to this invention under Management and Operating contract No. DE-AC05-84ER 40150 from the Department of Energy.

FIELD OF THE INVENTION

The present invention relates to a method for determining the mobility of hydrogen as a function of temperature in niobium cavities and more particularly to such a method that utilizes a relatively simple and straight forward ion chamber radiation detector based system for such determination.

BACKGROUND OF THE INVENTION

Niobium and hydrogen can form a niobium hydride surface coating on superconducting niobium cavities at approximately 100° K. The niobium hydride interrupts the superconducting properties of the cavity surface and causes what is commonly referred to as "Q disease". A superconducting niobium cavity suffering from Q disease must be put through a costly time and energy thermal cycle to remove the effects of Q disease. Determining the mobility of hydrogen as a function of temperature in superconducting niobium cavities can contribute significantly to the understanding of conditions that promote or cause Q disease. It would therefore be highly useful to have a method for determining the mobility of hydrogen as a function of temperature in superconducting niobium cavities.

OBJECT OF THE INVENTION

It is therefore an object of the present invention to provide have a method for determining the mobility of hydrogen as a function of temperature in superconducting niobium cavities.

SUMMARY OF THE INVENTION

According to the present invention, there is provided a method for determining the mobility of hydrogen as a function of temperature in superconducting niobium cavities comprising: 1) heating a cavity under test to remove free hydrogen; 2) introducing hydrogen-3 gas into the cavity; 3) cooling the cavity to allow absorption of hydrogen-3; and 4) measuring the amount of hydrogen-3 by: a) cooling the cavity to about 4° K while in the presence of a regulated amount of tritium gas in the cavity; b) allowing the cavity to warm at a stable rate to 4.22° K; c) allowing the cavity to warm to room temperature and as it warms flowing high quality helium gas through the cavity; and d) directing the exit gas to an ion chamber radiation detector.

DETAILED DESCRIPTION

Figure 1:
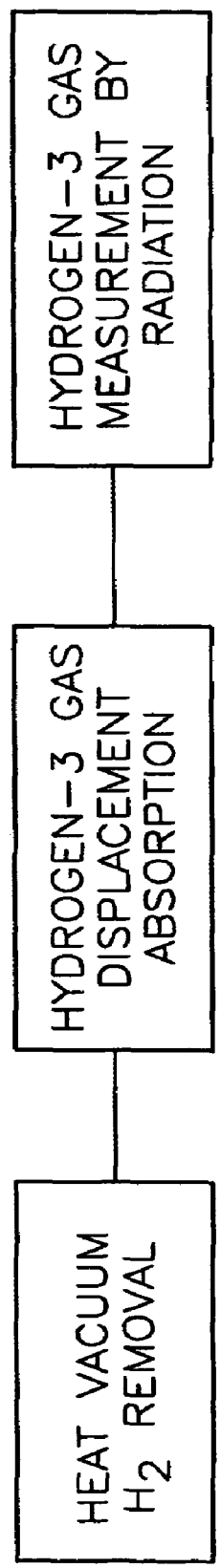
FIG. 1 is a process flow diagram for the hydrogen mobility determination process of the present invention.

As depicted in FIG. 1, the method of the present invention comprises: 1) heating a cavity under test in a vacuum to remove free hydrogen; 2) introducing hydrogen-3 gas into the cavity; 3) cooling the cavity to allow absorption of hydrogen-3; and 4) measuring the amount of hydrogen-3 by: a) cooling the cavity to about 4° K while flowing a known and regulated amount of helium into the cavity; b) allowing the cavity to warm at a known stable rate from 4.22° K to room temperature; and c) directing gas exiting the chamber to an ion chamber radiation detector that measures current from tritium beta particle energy in the gas exiting the chamber.

After introduction of the hydrogen-3 gas into the hydrogen purged cavity, sufficient time must be allowed to elapse for hydrogen exchange between the hydrogen and hydrogen-3 to fully occur. Such residence can require several hours, but is readily determinable by trial and error for any specified niobium cavity. Allowing the cavity to cool after introduction of the radioactive hydrogen-3 and passage of a suitable residence time allows for tens of milligrams (tens of Curies) of hydrogen-3 to be absorbed by the niobium surface. Such levels of radioactivity are readily detectable by the ion chamber radiation detector as current produced from tritium beta particle energy in the exit gas.

As the helium carrier gas that is circulated through the cavity during warming exits the cavity, it may be necessary to mix the carrier gas with about one part in ten of an organic gas, such as methane, to achieve proper ion chamber function.

The ion chamber radiation detector measures current from tritium beta particle energy deposited in the helium carrier gas. The rate of hydrogen devolution as the cavity warms is proportional to the ionization current in the ion chamber radiation detector. Care must be exercised in the design, construction and operation of the ion chamber radiation detector to insure that a "guard" detector is utilized to correct for background ionizing radiation associated with radioactive contaminants in the construction materials and the effects of cosmic ray interactions on the detector.

The various apparatus used in the successful practice of the present invention are well known in the art as are the manipulative techniques for obtaining the cooling, heating and transfer of the detector and carrier gases described herein and useful ion radiation detectors useful in the successful practice of the invention are commercially available.

There has thus been described a method that can be used to identify the rate at which hydrogen devolves from the surface of a niobium cavity as a function of the temperature of that cavity and hence the term during which treatment to remove hydrogen from the surface of a niobium superconductive cavity must be conducted to inhibit the development of Q disease.

As the invention has been described, it will be apparent to those skilled in the art that the same may be varied in many ways without departing from the spirit and scope of the invention. Any and all such modifications are intended to be included within the scope of the appended claims.

What is claimed is:

1. A method for determining the mobility of hydrogen as a function of temperature in superconducting niobium cavities comprising:
   a) heating a cavity under test to remove free hydrogen;
   b) introducing hydrogen-3 gas into the cavity;
   c) cooling the cavity to 4° K for a period sufficient to allow hydrogen exchange between the introduced hydrogen-3 and any residual hydrogen; and
   d) measuring the amount of hydrogen-3 absorbed by the cavity by:

i) warming the cavity to about 4.22° K while flowing a known and regulated amount of helium carrier gas into the cavity;

ii) allowing the cavity to warm at a stable known rate from 4.22° K to room temperature as the carrier gas leaves the chamber as an exit gas; and iii) directing the exit gas to an ion chamber radiation detector to measure the level of radiation in the exit gas, which level of radiation correlates with the concentration of hydrogen-3 devolved from the niobium cavity as a function of the temperature of the cavity.

2. The method of claim 1 wherein about one part in ten of an organic gas is added to the exit gas as it exits the niobium cavity.

3. The method of claim 2 wherein the organic gas is methane.

* * * * *